(12) United States Patent
Ilan et al.

(10) Patent No.: US 7,099,459 B2
(45) Date of Patent: Aug. 29, 2006

(54) METHOD AND DEVICE FOR HANDLING ECHO IN A COMMUNICATION NETWORK

(75) Inventors: Amir Ilan, Kfar Sava (IL); David Vinter, Herzlia (IL); Alfi Gavish, Ramat Hasahron (IL); Nimrod Aharonovitch, Petach Tikva (IL)

(73) Assignee: Veraz Networks Ltd., Petach Tikva (IL)

( * ) Notice: Subject to any disclaimer, the term of this patent is extended or adjusted under 35 U.S.C. 154(b) by 166 days.

(21) Appl. No.: 10/440,161

(22) Filed: May 19, 2003

(65) Prior Publication Data

US 2003/0219114 A1    Nov. 27, 2003

(30) Foreign Application Priority Data

May 26, 2002    (IL) .................................... 149847

(51) Int. Cl.
   *H04B 3/20*    (2006.01)
   *H04L 12/66*    (2006.01)
(52) U.S. Cl. ............................. 379/406.01; 379/100.09
(58) Field of Classification Search ..............................
   379/406.01–406.04, 100.01, 100.09, 100.012,
   379/100.17
   See application file for complete search history.

(56) References Cited

U.S. PATENT DOCUMENTS

| | | | |
|---|---|---|---|
| 1,619,891 A | 3/1927 | Silent | |
| 5,450,487 A | 9/1995 | Lähdemäki et al. | |
| 6,434,169 B1 | 8/2002 | Verreault | |
| 6,480,585 B1 * | 11/2002 | Johnston | ................ 379/100.17 |
| 6,549,587 B1 * | 4/2003 | Li | ............................... 375/326 |
| 6,788,651 B1 * | 9/2004 | Brent et al. | ................. 370/255 |
| 6,940,972 B1 * | 9/2005 | Wildfeuer et al. | ..... 379/406.04 |

FOREIGN PATENT DOCUMENTS

| | | |
|---|---|---|
| EP | 1 202 516 | 5/2002 |
| WO | WO 93/05597 | 3/1993 |

OTHER PUBLICATIONS

ITU-T Standard Recommendation T.38, "*Procedures for real-time Group 3 facsimile communication over IP networks*", (Mar. 2002).
ITU-T Standard Recommendation G. 766, "*Facsimile demodulation/remodulation for digital circuit multiplication equipment*", (Nov. 1996).
ITU-T Standard Recommendation G.122, "*Influence of national systems on stability and talker echo in international connections*", (Mar. 1993).
"Voice over Frame Relay Implementation Agreement", FRF.11.1, Frame Relay Forum Technical Committee, Dec. 1998.

* cited by examiner

*Primary Examiner*—Daniel Swerdlow
(74) *Attorney, Agent, or Firm*—Nath & Associates PLLC; Harold L. Novick

(57) ABSTRACT

A method is provided for use with a telecommunication relay device adapted to convey voice-band data signals over a given transmission path in a telecommunication network, which relay comprises a transmitter operative to encode and transmit voice-band data information, and a receiver operative to receive and decode said information and regenerate a voice-band data signal therefrom. The method that is provided comprises handling an echo associated with the regenerated signal and returned from the telecommunication network, in order to prevent it from being relayed backwards, thus impairing the voice-band data call process. The method comprises detecting and identifying the returned echo as such, and preventing it from being relayed.

24 Claims, 4 Drawing Sheets

METHOD AND DEVICE FOR HANDLING ECHO IN A COMMUNICATION NETWORK

FIELD OF THE INVENTION

The present invention relates to a method and a device for transmission of VBD type of signals via relaying means.

BACKGROUND OF THE INVENTION

Traditional PSTN networks (Plain Service Telephone Network) include 2 wire to 4 wire hybrids. These hybrids introduce what is known in the art as "echo" in telephony, e.g. a signal reflected from a far end circuit, and returned to a transmitting (near end) circuit. This phenomenon of a returned echo is well recognized both while transmitting voice signals and VBD type of signals.

FIG. 1 illustrates an example of a traditional PSTN network 1, in which facsimile device 5 receives signals originated by facsimile 3 at a significantly higher power level than that of the echo signals reflected from hybrid 7 (which path is indicated by 11). The echo signals are formed as a result of hybrid 7 reflecting back signals received from facsimile 5. The attenuation of the returned signal (echo) introduced by the hybrid is called Echo Return Loss (and will be referred to hereinafter as "ERL"). Typical echo control devices require a minimum ERL of 6 db (in accordance with ITU-T Recommendation G.122). Facsimile machines are designed to operate under such PSTN/ISDN conditions, i.e. attenuated echo signals.

When dealing with the transmission of voiceband data ("VBD") type of signals, e.g. when there is a need to relay a facsimile, a modem or a DTMF transmission so that it can be transmitted over a media other than PSTN, and/or in order to reduce bandwidth requirements and even improve call completion rate, a VBD relay is often used. The term "VBD relay" as used hereinafter, is used to denote a device adapted to operate by processing analog signals (or digitally sampled analog signals) transmitted from a suitable originating machine and by generating a new (corresponding) VBD signal that carries information of the original signals transmitted towards a matching destination device over the applicable network, e.g. over an IP-based network. In the case that the VBD signals are of the facsimile type or of the modem type, the analog signals (or their digitally sampled presentation) are demodulated in the VBD relay, transmitted over to the corresponding relay at the other side of the transmission path and remodulated thereat. Principles of such VBD relay method are illustrated in FIG. 2. When the VBD signal is of the DTMF type, the analog signals (or their digitally sampled presentation) are encoded (i.e. identified and the information retrieved is represented in a coded form), transmitted over to the corresponding relay at the other side of the transmission path, decoded and regenerated thereat. As will be appreciated by those skilled in the art the term "VBD relay mode" should be understood to encompass a mode by which a VBD relay may operate, i.e. encoding a VBD signal by retrieving data included in the VBD signal (e.g. demodulation of a facsimile or of a modem signal) and representing it in a coded form, decoding an encoded VBD signal and regenerating a second VBD signal that carries information based on the information comprised in the original VBD signal (e.g. re-modulating the demodulated facsimile or modem). As would be appreciated by those skilled in the art, the regenerated second VBD signal may be, but not necessarily, identical to the original VBD signal.

A typical VBD relay as known in the art, comprises a Tx unit (module) and an Rx unit (module). In the example shown in FIG. 2, the Tx unit of the near end VBD relay 31 receives VBD type of transmission from the near end VBD signals' originating machine 25 (e.g. fax machine), detects and classifies the VBD signals, retrieves the information comprised therein, formats the information into a coded form and transmit their coded representation towards the Rx unit of the far end VBD relay 33. The Rx unit decodes the coded representation, regenerates a corresponding second VBD signal and transmits the regenerated signal to the far end VBD terminal 23 via hybrid device 27. In such a scenario, echo signals are reflected back from hybrid device 27, but contrary to the situation described above for PSTN networks, in the present case there is no guaranteed signal transparency between hybrid 27 and hybrid 29 due to the existence of VBD relays 31 and 33 along the transmission path. Therefore, appropriate measures must be taken in order to let the VBD transmission be successfully completed under these conditions.

As opposed to fax machines and dial-up modems, which are typically equipped with their own mechanisms to manage the progress of the communication session, a VBD relay is an entity that does not initiate nor is provided with information allowing independent handling of the communication session thereby. In other words, such a VBD relay typically operates as a "slave" of the VBD communication device that is linked thereto. This fact raises a problem that since a VBD relaying device is not provided with effective means to reduce the impact of the return echo, the encoded return echo signal received by the VBD relay is decoded and regenerated, or in other words, is treated as a legitimate VBD signal that should be processed when in fact such a signal should be discarded.

Another problem associated with the methods used in the art to handle fax relay devices, is that the fax relay might amplify the echo signal to a level which the fax machines themselves will not be capable of handling by using the conventional means which they are provided with.

Fax Relay methods have been described in a number of international standards. ITU-T Recommendation G.766 describes a Fax Relay method for TDM networks. ITU-T Recommendation I.366.2 describes such a method for ATM networks, ITU-T Standard Recommendation T.38 describes a Fax Relay method for IP networks, whereas Frame Relay Forum "Voice over frame relay implementation agreement" FRF.11 describes a Fax Relay method for Frame Relay networks.

However, neither of these publications suggests a method to control the echo signals during facsimile transmissions. When implementing fax relay over a packet network, one possible implementation of the T.38 standard is to re-modulate all signals at a predefined nominal level (e.g. −13 dbm0). In this case both the original source A signal as well as the echo signal of source B will arrive at facsimile terminal B at the same nominal level. Under these conditions the correct completion of the fax transaction cannot be guaranteed.

One method of addressing the return echo problem fax relay is described in ITU-T Standard recommendation G.766. The method provided in this Recommendation is to control the power level of the signals. According to this method, the demodulator side of the fax relay, relays also the power level of the received signal to the far end remodulator side. Consequently, this method guarantees similar echo levels like when operating without fax relay. However, this method does not provide a solution to ensure that the echo returned signals are discarded already at the transmitting fax relay, avoiding the transmission of the echo return signals over the whole transmission path.

The disclosure of the references mentioned throughout the present specification are hereby incorporated by reference.

SUMMARY OF THE INVENTION

It is therefore the object of the invention to provide a method and a system for handling echo while using a device adapted for use as a relay for voiceband data type of signals.

Further objects and features of the invention will become apparent to those skilled in the art from the following description and the accompanying drawings.

In accordance with the present invention there is provided a method for handling a returned echo during transmission of a VBD signal, which method comprises:
  i. receiving a first VBD signal at a first Tx unit of a first VBD relay station which comprises a first Tx unit and a first Rx unit;
  ii. encoding said first VBD signal;
  iii. transmitting said encoded first VBD signal along a transmission path towards a second VBD relay station which comprises a second Tx unit and a second Rx unit;
  iv. receiving said encoded first VBD signal at said second VBD relay station;
  v. decoding said encoded first VBD signal thus received, generating a second VBD signal that carries information which is based on information comprised in said first VBD signal;
  vi. transmitting the second VBD signal from said second Rx unit of said second VBD relay station towards a device adapted to receive such VBD signals, wherein an echo of said second VBD signal is returned to said second Tx unit of said second VBD relay station; and
  vii. preventing transmission of an encoded returned echo of said second VBD signal from said second Tx of said second VBD station, wherein said Tx unit is operative in a VBD relay mode as long as the expected affecting period has not lapsed.

As will be appreciated by those skilled in the art, the step of receiving VBD signals may relate either to receiving signals that are known to be of a certain VBD type, or to receiving signals and detecting certain VBD signals among the signals received. The detection of VBD signals, optionally further comprises a step of classifying the signals. The term "detecting" or "detection" as used herein may refer at times to the combined operation (i.e. detection and classification) while at other times only to the detection part.

The term "expected affecting period" as will be used herein, is used to denote the period during which the operation of the second demodulating/remodulating station might be affected by the returning echo. This period may be equal to the period during which the step of transmitting (step vi above) is still being carried out. Alternatively, this period may be extended or shortened in respect to the period during which the step of transmitting (step vi above) is being carried out, and depend also on the time required for detecting (with or with classifying) the signals to be transmitted and depend on the expected echo path delay as defined in ITU-T Recommendation G. 168.

As was previously explained, the encoding of a VBD signal is carried out by retrieving data included in the VBD signal (e.g. demodulation of a facsimile or of a modem signal) and formatting it so that it could be transmitted in a coded form. At the other side of the transmission path the thus formatted signal is typically unformatted (decoded) and a second VBD signal that carries information based on the information comprised in the original VBD signal (e.g. re-modulating the demodulated facsimile or modem) is generated. As would be appreciated by those skilled in the art, the generated second VBD signal may be, but not necessarily, identical to the original VBD signal.

According to a preferred embodiment of the invention, the step vii. of preventing transmission of the returned echo comprises discarding signals incoming to the Tx unit of the second VBD station.

According to another preferred embodiment of the invention, step vii. of preventing transmission of the returned echo comprises suppressing at least part of the signals incoming to the Tx unit of the second VBD station.

By yet another preferred embodiment, step vii. of preventing transmission of the returned echo comprises suppressing signals or part thereof incoming to the Tx unit of said second VBD station, wherein the signals or part thereof being at a frequency range which is substantially the same as the frequency range of signals transmitted from the second Rx unit of the second VBD relay station.

By another preferred embodiment of the invention, step vii. of preventing transmission of the returned echo comprises discarding signals of a pre-defined type incoming to said second VBD relay station.

In accordance with yet another preferred embodiment of the invention, step vii. of preventing transmission of the returned echo comprises disabling the encoding of said second VBD relay station so that either all signals or only those of pre-defined type(s) will not be encoded. Also, the disabling of the encoding may be carried out for those signals which are compatible with pre-defined international standards. In addition or in the alternative, the encoding in the Tx unit of the second VBD relay station is prevented in response to detecting certain pre-defined signals, certain pre-defined tones, certain pre-defined double tones and the like, or any combination thereof.

By still another preferred embodiment of the invention, step vii. of preventing transmission of the returned echo comprises discarding encoded signals of said returned echo, thereby preventing their transmission.

According to another preferred embodiment of the invention, step vii. of preventing transmission of said returned echo is carried out in response to detecting signals having energy level that is less than a pre-defined threshold. Preferably, this pre-defined threshold is substantially equal to the expected maximum energy of said returned echo. More preferably, the expected maximum energy of said returned echo is a function of the energy of the remodualed signal and the estimated ERL of the network.

According to still another embodiment of the invention, the VBD signal is encoded by a speech encoder at the first VBD relay station and decoded by a corresponding decoder at the second VBD relay station. For example, when the VBD signal is a signal of the facsimile type, as an alternative to its demodulation at the first VBD relay station and remodulation at the second VBD relay station, the signal could be encoded at the first VBD relay station, transmitted to the second VBD relay station and decoded thereat by a corresponding speech decoder. Preferably, the VBD signal is a member of the group comprising a facsimile signal, a modem signal and a DTMF signal.

According to still another preferred embodiment of the invention, step vii. of preventing transmission of said returned echo comprises:

a. receiving a predefined inhibiting indication at the second Tx unit; and
b. preventing the second Tx unit from transmitting processed second VBD signals in response to receiving the predefined inhibiting indication.

Preferably, the inhibiting indication comprises information regarding the power level of the signals transmitted by the Rx unit of said second VBD relay station.

By yet another preferred embodiment of the present invention, the method provided further comprises:
a. setting pre-defined values for parameters characterizing a path along which an echo return is expected;
b. providing information related to signals transmitted from the second Rx of the second VBD relay station;
c. deriving a criterion for identifying a returned echo based on these parameters and the information provided in step b above;
d. determining whether a signal received at the second Tx of the second VBD relay station is a returning echo based on the criterion derived;
e. preventing the transmission of a processed returned echo in accordance with step vii. described above in the case that the received signal is determined to be a returned echo.

Alternatively, this option may further comprise the steps of:
f. calculating new values for the parameters characterizing the path along which a returned echo is expected, wherein the new values are retrieved form the received signal;
g. setting the calculated new values for the parameters.
h. repeating steps b to g.

Preferably, these parameters are selected from among ERL of the echo return path, at least one path delay, at least one path dispersion, and any combination thereof.

According to another embodiment of the invention, the method provided further comprising a step of measuring a delay period at the second VBD relay station which period extends from the start of decoding till the arrival of a returned echo signal, and delaying transmission of the predefined inhibiting indication by a period that is substantially equal to the measured delay.

According to another aspect of the invention there is provided VBD relay station adapted to operate on a VBD signal. The station comprises:
at least one receiver;
at least one decoder;
at least one transmitter;
at least one encoder;
at least one controller;
echo characterization means;
and wherein the VBD relay station is characterized in that if a received signal is estimated by the echo characterization means as being a possible echo signal, no encoded signals are transmitted from the VBD relay station for an expected affecting period.

Preferably, the VBD relay station further comprises a speech encoder and a speech decoder.

In accordance with a preferred embodiment of the invention, the echo estimation means comprise an inhibiting indication generator adapted to provide an inhibiting indication to prevent transmission of encoded signals from the VBD relay station based on at least one of the following parameters: ERL value, maximum ERL, path delay, maximum path delay, classification of the signals received for decoding, or any combination thereof.

According to yet another embodiment, the VBD relay station further comprises an energy level estimator, adapted to analyze TDM signals received at the VBD relay station.

By still another preferred embodiment of the invention, the VBD relay station further comprises a suppression unit adapted to suppress at least a part of TDM signals incoming into the VBD relay station, in response to determining that an incoming signal is a suspected returned echo signal.

Preferably, the VBD relay station further comprises processing means operative to determine whether an incoming signal is a returned echo signal of a VBD signal, based on information retrieved from said echo characterization means.

By still another preferred embodiment, the VBD relay station further comprises measuring means adapted to measure a delay in arrival of an echo signal thereto and delaying means operative to delay the operation of preventing the transmission of encoded signals from said second VBD relay station by a period that is substantially equal to a measured delay.

According to another aspect of the invention there is provided a communication system comprising:
a packet switched network; and
at least two VBD relay stations of the type described above, each of which is adapted to receive and transmit signals from/to said packet switched network and to be in communication with at least one VBD communication device along a TDM network.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Figure 1:
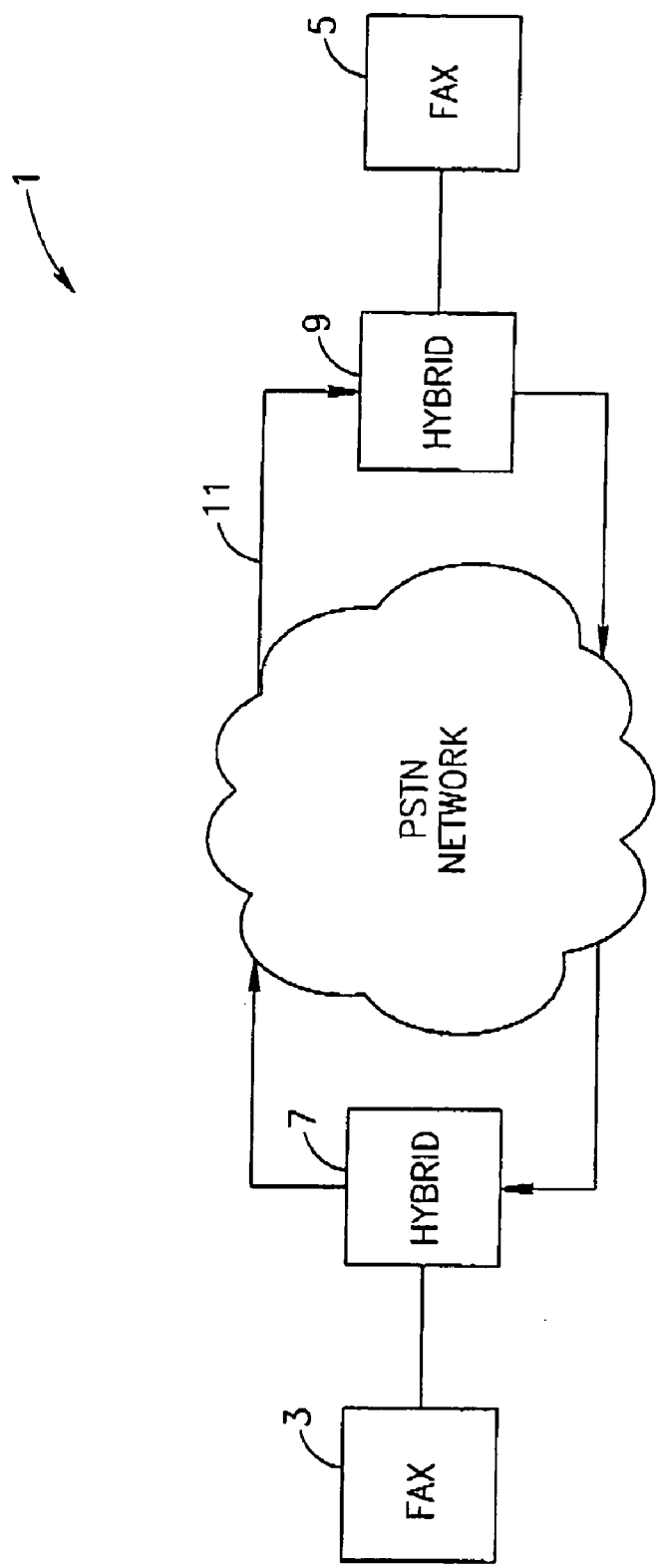
FIG. 1—is a schematic block-diagram illustrating echo signal during fax transmission in PSTN network (prior art)
Figure 2:
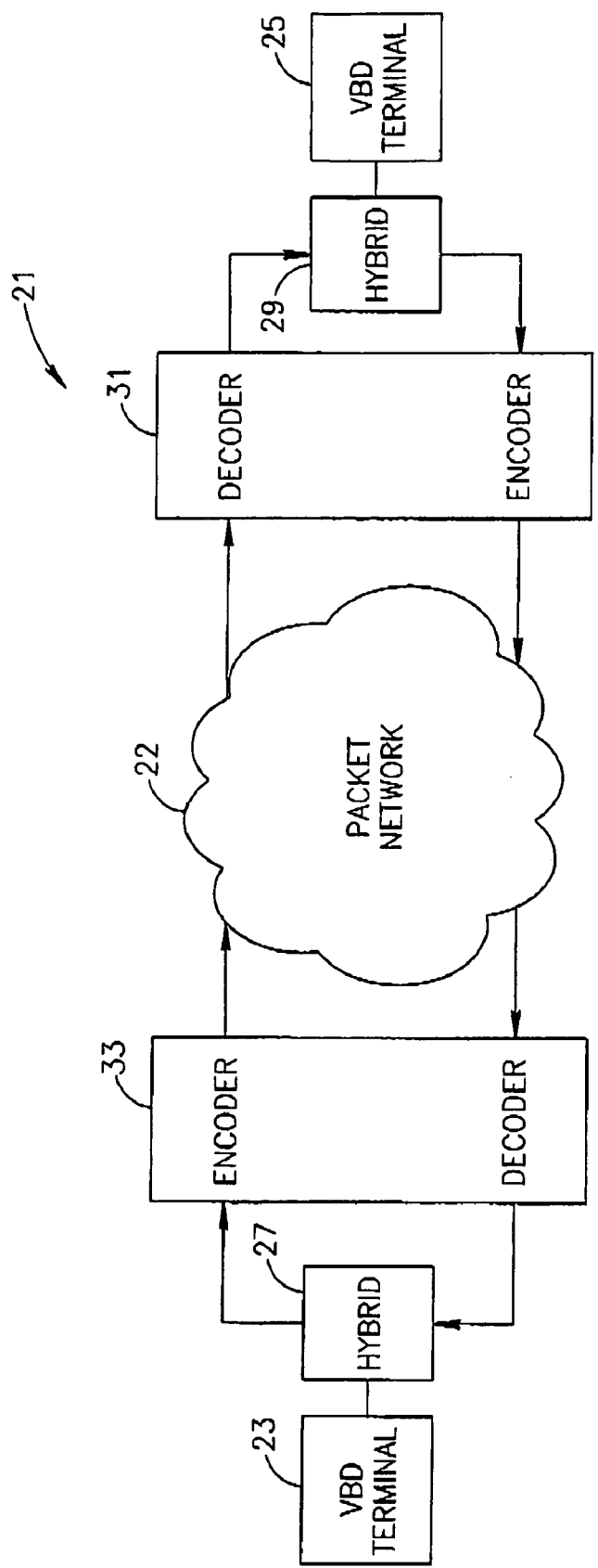
FIG. 2—is a schematic block-diagram illustrating echo signal during fax transmission via a packet network (prior art)

The present invention provides a method for suppressing an echo during a communication session of facsimile transmission via a packet network. As shown in FIG. 2, system 21 comprises a near end and a far end. Typically, each such end of the system is provided with a device adapted to transmit/receive facsimile signals (23 for the near end and 25 for the far end), a hybrid circuit (27 for the near end and 29 for the far end) and a fax relay unit (33 for the near end and 31 for the far end) having a demodulator for transmitting packets to the packet network 22, and a re-modulator for transmitting packets from the packet network. In the example described herein the problem which the present invention seeks to solve is the following. A facsimile signal is transmitted by device 25 towards device 23. However, when this signal reaches hybrid 27 an echo signal having a reduced power level, e.g. by −13 db is returned towards fax relay unit 33. The echo signal returned from hybrid 27 may be interpreted by the fax relay unit 33 as a genuine signal transmitted from device 23 towards relay unit 31 and has therefore to be demodulated.

Figure 3:
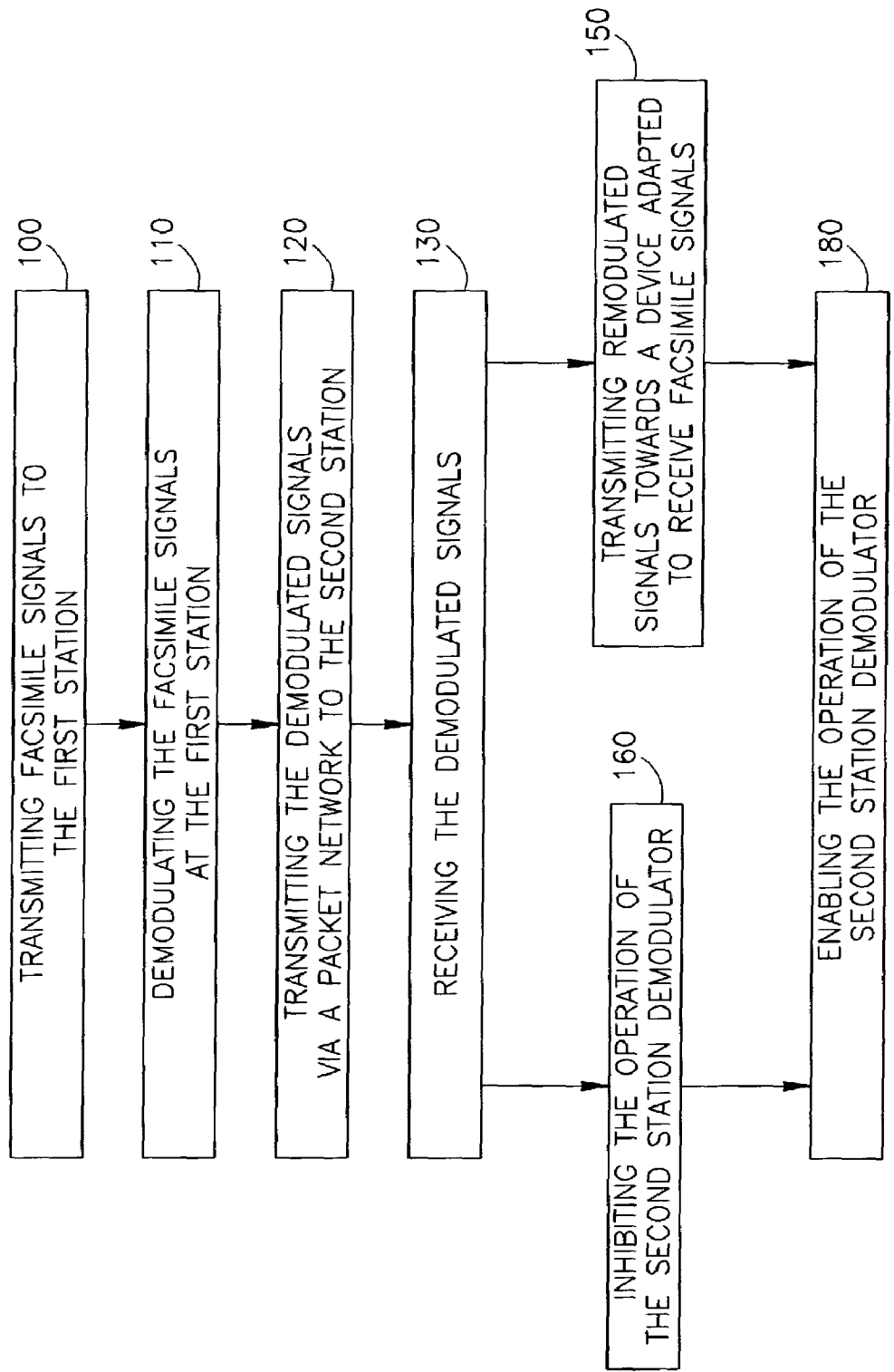
FIG. 3—is a flow chart illustrating the implementation of the method of the present invention.

The method provided by the present invention is illustrated by FIG. 3 for the case where the VBD signal is a facsimile signal. By this example the method comprises the following steps. A facsimile signal is transmitted via a first two-wire to four-wire hybrid circuit to a first demodulating/remodulating station (step 100). The facsimile signal received is demodulated (step 110) at the first demodulating/remodulating station. Following its demodulation, the demodulated facsimile signal is transmitted (step 120) via a packet network to a second demodulating/remodulating station. At the second demodulating/remodulating station, the demodulated facsimile signal is received (step 130). Next, the operation of the station's demodulator is inhibited (160) in order to prevent the processing of a returned echo. Simultaneously, the remodulated signals are transmitted towards the local facsimile device (step 150). The inhibited demodulator remains in this state as long as the demodulated signal is being remodulated by the remodulator of the same station. When the remodulation process is completed, the inhibited demodulator resumes normal operation (step 180).

According to a preferred embodiment of the invention, the method provided further comprises the step of transmitting an indication of the power level received from the first demodulating/remodulating station to the second demodulating/remodulating station. This latter embodiment is particularly useful in cases where high echo levels are present along the transmission path.

According to another embodiment of the present invention the step of disabling the demodulator can be withheld in a number of occasions. For example, the disabling can be conditioned so that it is carried out only when the received power level, Pb, is lower than or equal to the expected maximum echo signal level Pbe, which can be calculated as follows:

$$Pbe=Pa-ERLmin,$$

where

Pa—is the remodulated signal power level;
Pb—is the received power level at the demodulator side;
Pbe—is the maximum expected echo power level at the demodulator side; and
ERLmin—is the minimum echo return loss of the hybrid.

This allows avoiding the need to inhibit the demodulator when the power level of the facsimile signal arriving at the demodulator side is higher than the expected maximum power level of the echo signal.

According to a further embodiment of the invention, the actual echo return loss is measured during the initial phases of a facsimile call (e.g. during transmission of facsimile machine calling or answer tones). In accordance with this embodiment, the demodulator function is to be inhibited only if the received power level at the demodulator is lower or equal to the expected maximum echo signal level Pbe, where the latter is defined as:

$$Pbe=Pa-ERL,$$

wherein

Pa—is the remodulated signal power level;
Pb—is the received power level at the demodulator side;
Pbe—is the maximum expected echo power level at the demodulator side; and
ERL—is the measured echo return loss.

More preferably, the ERL is equal to the actual measured echo return loss, less a predefined engineering safety factor, e.g. 2 db less than the actual measured echo return loss.

In the case that the level of the facsimile signal arriving to the demodulator side is higher than Pbe, the step of disabling the demodulator shall not be carried out.

The method provided by the invention may further be refined to allow for a delay in the arrival of the echoed signal to the demodulating station. Such a delay is typically dependent on the physical length of the path extending between the fax relay device and the near end hybrid device, and consequently under certain circumstances, the echoed signal may arrive to the demodulator even after the remodulator has stopped transmitting energy.

Typically, such a delay is less than 30 msec, but it may be higher for certain applications. Therefore, in accordance with this embodiment of the invention, this delay is measured by any suitable method of those known in the art per se, and once its value is known, the disabling signal to be sent from the remodulating station to the demodulating station is delayed by a period that is substantially equal to that known delay.

Figure 4:
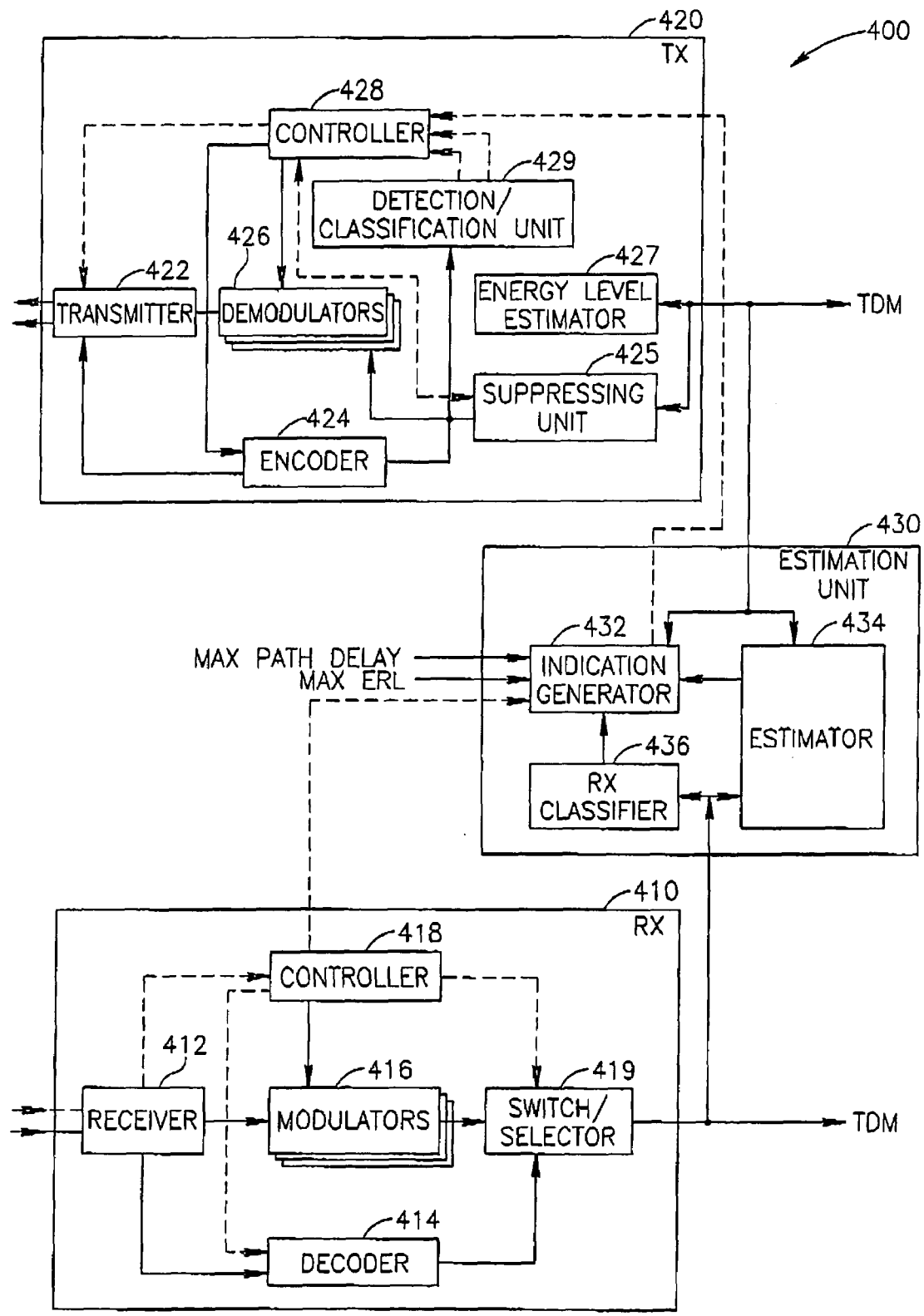
FIG. 4—is a schematic illustration of a fax relay that is adapted to operate in accordance with the present invention.

FIG. 4 illustrates an example of a fax relay device 400 adapted to operate in accordance with the present invention. The fax relay is shown herein as comprising three inner units, but this arrangement is shown purely for the sake of simplicity and should not be considered to limit the present invention.

The three units are Rx (410), Tx (420) and estimation unit (430). At the receiving side of Rx 410, traffic and messages reach receiver 412 and may be directed either to voice decoder 414 in the case that the traffic is a voice traffic that have to be decoded, or to the modulator 416. Typically, modulator 416 comprises a plurality of modulator, each adapted to operate differently than the other (e.g. each corresponding to different international standard). The relevant information retrieved by receiver 412 is forwarded to controller 418, and consequently may also affect the operation of modulator(s) 416 or decoder 414, e.g. by enabling the appropriate transmission path through switch/selector 419. The traffic that leaves Rx 410 is then forwarded towards the TDM network (not shown).

Signals transmitted by the Rx are also sent to estimation unit 430. The relevant information is then fed optionally either to an estimator 434 of the echo's parameters, or to Rx classifier 436, or both. The output of the latter two units 434 and 436 is fed into inhibiting indication generator 432, which generates an indication of inhibition for the Tx based on the outcome of the processed information. However, as will be appreciated by those skilled in the art, the use of estimator 434 may be avoided by providing generator 432 with pre-configured data describing the maximum ERL and/or maximum path delay. Also, the use of Rx classifier 436 may be avoided by feeding information retrieved from controller 418 directly to generator 432. The output of generator 432 (the inhibition indication is then forwarded to controller 428 of Tx 420.

The signal received from the TDM network at the Tx unit is analyzed by Tx energy level estimator 427 and by detection/classification unit 429. The analysis information is forwarded to controller 428, which in turn activates the appropriate demodulator(s) 426 or voice encoder 424 as well as transmitter 422. The activation of transmitter 422 by controller 428 further includes the option of remotely operating Rx controller 418 by sending control messages via transmitter 422 along the transmission path extending toward receiver 412, and consequently to controller 418. Based on the information controller 428 retrieves from unit 430 and the information received from Tx energy level estimator 427 and from detection/classification unit 429, may adjust the operation of any one of the following modules in order to prevent the processing of returned echo in Tx 420: suppression unit 425 which is adapted to suppress the signal incoming thereto from the TDM network, detection/classification unit 429 which will in turn prevent the detection and classification of certain signals which are suspected to be a returned echo, adjust the operation of demodulator(s) 426 so as the demodulation of signals suspected to be a return echo will be prevented, or block transmitter 422 from transmitting the demodulated information received from demodulator(s) 426 or from voice encoder 422, as the case may be, when the incoming signal is suspected to be the return echo.

Once traffic is not suppressed by unit 425, it will be directed either to voice encoder 424 when the traffic is of the voice type and has to be encoded, or to remodulator(s) 426. Thereafter, traffic is transmitted via transmitter 422 towards the transmission path and to the corresponding fax relay at the other side of that path, e.g. through one or more IP networks.

It will be appreciated that the above-described methods may be varied in many ways, including but not limited to, changing the exact implementation used. It should also be appreciated that the above described description of methods and networks are to be interpreted as including network in which the methods are carried out and methods of using the network components.

The present invention has been described using nonlimiting detailed descriptions of preferred embodiments thereof that are provided by way of example and are not intended to limit the scope of the invention. It should be understood that features described with respect to one embodiment may be used with other embodiments and that not all embodiments of the invention have all the features shown in a particular figure. Variations of embodiments described will occur to persons of the art. Furthermore, the terms "comprise", "include", "have" and their conjugates shall mean, when used in the claims "including but not necessarily limited to".

The invention claimed is:

1. A method for handling a returned echo during transmission of a voice band data (VBD) signal, which method comprises:
   i. receiving a first VBD signal at a first Tx unit of a first VBD relay station which comprises a first Tx unit and a first Rx unit;
   ii. encoding said first VBD signal;
   iii. transmitting said encoded first VBD signal along a transmission path towards a second VBD relay station which comprises a second Tx unit and a second Rx unit;
   iv. receiving said encoded first VBD signal at said second VBD relay station;
   v. decoding said encoded first VBD signal thus received;
   vi. generating a second VBD signal that carries information which is based on information comprised in said first VBD signal;
   vii. using information comprised in said received encoded first VBD signal in determining whether an echo of said second VBD signal would be expected at said second VBD relay station, and if in the affirmative, determining whether there is a need to cease processing for transmission at least a portion of the signals received by said second VBD relay station in order to prevent transmission of an encoded returned echo;
   viii. transmitting the second VBD signal from said second Rx unit of said second VBD relay station towards a device adapted to receive such VBD signals, wherein an echo of said second VBD signal is returned to said second Tx unit of said second VBD relay station;
   ix. activating said second Tx unit of said second VBD relay station in a VBD relay mode if said second Tx unit is not already operative in a VBD relay mode; and
   x. preventing transmission of said encoded returned echo of said second VBD signal from said second Tx of said second VBD station as long as the expected affecting period has not lapsed.

2. A method according to claim 1, wherein step x. of preventing transmission of said returned echo comprises discarding signals incoming to the Tx unit of said second VBD station.

3. A method according to claim 1, wherein step x. of preventing transmission of said returned echo comprises suppressing at least part of the signals incoming to the Tx unit of said second VBD station.

4. A method according to claim 1, wherein step x. of preventing transmission of said returned echo comprises suppressing signals or part thereof incoming to the Tx unit of said second VBD station, wherein said signals or part thereof being at a frequency range which is substantially the same as the frequency range of signals transmitted from said second Rx unit of said second VBD relay station.

5. A method according to claim 1, wherein step x. of preventing transmission of said returned echo comprises discarding signals of a pre-defined type incoming to said second VBD relay station.

6. A method according to claim 1, wherein step x. of preventing transmission of said returned echo comprises disabling the encoding of said second VBD relay station so that either all signals or only those of pre-defined type(s) will not be encoded.

7. A method according to claim 1, wherein step x. of preventing transmission of said returned echo comprises discarding encoded signals of said returned echo, thereby preventing their transmission.

8. A method according to claim 1, wherein step x. of preventing transmission of said returned echo is carried out in response to detecting signals having energy level that is less than a predefined threshold.

9. A method according to claim 1, wherein said first VBD signal is being encoded at said first VBD relay station by a speech encoder and decoded by a corresponding decoder at said second VBD relay station.

10. A method according to claim 9, wherein said first VBD signal is a member of the group comprising a facsimile signal, a modem signal and a DTMF signal.

11. A method according to claim 1, wherein:
   said encoding of the first VBD signal comprises retrieval of the information comprised in said VBD signal and formatting it for transmission towards said second VBD relay station; and
   said decoding of the signal received by the second VBD relay station comprises unformatting the formatted signal thus received.

12. A method according to claim 11, wherein said first VED signal is a member of the group comprising a facsimile signal, a modem signal and a DTMF signal.

13. A method according to claim 1, wherein step x. of preventing transmission of said returned echo comprises:
   a. receiving a predefined inhibiting indication at said second Tx unit; and
   b. preventing said second Tx unit from transmitting processed second VBD signals in response to receiving said predefined inhibiting indication.

14. A method according to claim 13, wherein said inhibiting indication comprises information regarding the power level of the signals transmitted by the Rx unit of said second VBD relay station.

15. A method according to claim 1, further comprising:
a. setting predefined values for parameters characterizing a path along which an echo return is expected;
b. providing information related to signals transmitted from said second Rx of said second VBD relay station;
c. deriving a criterion for identifying a returned echo based on said parameters and the information provided in step b above;
d. determining whether a signal received at the second Tx of said second VBD relay station is a returning echo based on said derived criterion; and
e. preventing the transmission of a processed returned echo in accordance with step x. of claim 1 in the case that said received signal is determined to be a returned echo.

16. A method according to claim 15 further comprising the steps of:
f. calculating new values for the parameters characterizing the path along which a returned echo is expected, wherein the new values are retrieved form said received signal;
g. setting the calculated new values for said parameters; and
h. repeating steps b to g.

17. A method according to claim 15, wherein said parameters are selected from among Echo Return Loss (ERL) of the echo return path, at least one path delay, at least one path dispersion, and any combination thereof.

18. A VBD relay station adapted to operate on a VBD signal and capable of receiving signals from a second VBD relay station comprising:
at least one receiver;
at least one decoder;
at least one transmitter;
at least one encoder;
at least one controller;
echo characterization means; and
means to cause said transmitter to cease transmission of at least a portion of the signals transmitted by said second VBD relay station in order to prevent transmission of an encoded returned echo such that said VBD relay station is adapted not to transmit encoded signals for an expected affecting period if a received signal is estimated by said echo characterization means, using information comprised in an encoded VBD signal received at said VBD relay station, as being a possible echo signal.

19. A VBD relay station according to claim 18, further comprising a speech encoder and a speech decoder.

20. A VBD relay station according to claim 18, wherein said echo characterization means comprise an inhibiting indication generator adapted to provide an inhibiting indication to prevent transmission of encoded signals from said VBD relay station based on at least one of the following parameters: ERL value, maximum ERL, path delay, maximum path delay, classification of the signals received for decoding, or any combination thereof.

21. A VBD relay station according to claim 18, further comprising an energy level estimator, adapted to analyze TDM signals received at said VBD relay station.

22. A VBD relay station according to claim 18, further comprising a suppression unit adapted to suppress at least a part of TDM signals incoming into said VBD relay station, in response to determining that an incoming signal is a suspected returned echo signal.

23. A VBD relay station according to claim 18, further comprising processing means operative to determine whether an incoming signal is a returned echo signal of a VBD signal based on information retrieved from said echo characterization means.

24. A communication system comprising:
a packet switched network; and
at least two VBD relay stations according to claim 18, each of which is adapted to receive and transmit signals from/to said packet switched network and to be in communication with at least one VBD communication device along a TDM network.

* * * * *